(12) United States Patent
Schmid

(10) Patent No.: US 12,398,518 B2
(45) Date of Patent: Aug. 26, 2025

(54) PROCESSING SYSTEM AND METHOD FOR PERFORMING TRACK WORK

(71) Applicant: ROBEL Bahnbaumaschinen GmbH, Freilassing (DE)

(72) Inventor: Gregor Schmid, Ainring (DE)

(73) Assignee: ROBEL Bahnbaumaschinen GmbH, Freilassing (DE)

( * ) Notice: Subject to any disclaimer, the term of this patent is extended or adjusted under 35 U.S.C. 154(b) by 911 days.

(21) Appl. No.: 17/509,258

(22) Filed: Oct. 25, 2021

(65) Prior Publication Data

US 2022/0042250 A1 Feb. 10, 2022

Related U.S. Application Data

(63) Continuation of application No. PCT/EP2020/058746, filed on Mar. 27, 2020.

(30) Foreign Application Priority Data

Apr. 23, 2019 (DE) .......................... 102019205764.0

(51) Int. Cl.
*E01B 29/00* (2006.01)
*B25J 5/02* (2006.01)
*B25J 9/00* (2006.01)
*B25J 11/00* (2006.01)
(Continued)

(52) U.S. Cl.
CPC ................. *E01B 29/00* (2013.01); *B25J 5/02* (2013.01); *B25J 9/0009* (2013.01); *B25J 11/00* (2013.01); *B25J 13/08* (2013.01); *E01B 29/42* (2013.01)

(58) Field of Classification Search
CPC . B25J 11/00; B25J 13/08; B25J 9/0009; B25J 5/02; E01B 29/00; E01B 29/42
See application file for complete search history.

(56) References Cited

U.S. PATENT DOCUMENTS 3,896,734 A * 7/1975 Plasser .................... E01B 29/44
104/2
5,191,838 A * 3/1993 Hansen ................... E01B 29/24
104/2
5,615,615 A 4/1997 Theurer et al.
(Continued)

FOREIGN PATENT DOCUMENTS

| AU | 2017204414 A1 | 1/2018 |
| CN | 2628205 Y | 7/2004 |

(Continued)

OTHER PUBLICATIONS

Zahng Yuxi et al., Introduction to Industrial Robotics, p. 88, Beijing University of Science and Technology Press, Jul. 31, 2017, Beijing, China.—English Machine Translation.

*Primary Examiner* — Robert J McCarry, Jr.
(74) *Attorney, Agent, or Firm* — Laurence A. Greenberg; Werner H. Stemer; Ralph E. Locher

(57) ABSTRACT

A processing system has at least one multi-axis robot for performing track work. The processing system includes an enclosure in the form of a container for receiving the at least one multi-axis robot and at least one displacement device for displacing the at least one multi-axis robot between a transport position inside the enclosure and a working position outside the enclosure. This enables track work to be carried out in a simple, flexible, safe and reliable manner.

19 Claims, 10 Drawing Sheets

(51) Int. Cl.
*B25J 13/08* (2006.01)
*E01B 29/42* (2006.01)

(56) References Cited

U.S. PATENT DOCUMENTS

| | | | |
|---|---|---|---|
| 10,940,874 | B2 | 3/2021 | Schmid et al. |
| 2002/0170884 | A1* | 11/2002 | Thelen ................. B23K 9/0026 219/54 |

FOREIGN PATENT DOCUMENTS

| | | |
|---|---|---|
| CN | 2806039 Y | 8/2006 |
| CN | 2878462 Y | 3/2007 |
| CN | 201077941 Y | 6/2008 |
| CN | 101537553 A | 9/2009 |
| CN | 102392397 A | 3/2012 |
| CN | 206406795 U | 8/2017 |
| CN | 206982015 U | 2/2018 |
| CN | 108463388 A | 8/2018 |
| DE | 19532511 A1 | 3/1996 |
| DE | 102012003663 A1 | 8/2013 |
| DE | 102016000408 A1 | 7/2017 |
| DE | 102016218682 A1 | 3/2018 |
| DE | 102017107059 A1 | 10/2018 |
| DE | 102017009710 A1 | 4/2019 |
| EP | 3263768 A1 | 1/2018 |
| EP | 3263786 A1 | 1/2018 |
| JP | 2019012394 A | 1/2019 |
| WO | WO-9931322 A1 * | 6/1999 ............. B23K 37/04 |

* cited by examiner

PROCESSING SYSTEM AND METHOD FOR PERFORMING TRACK WORK

CROSS-REFERENCE TO RELATED APPLICATION

This application is a continuation, under 35 U.S.C. § 120, of copending international patent application PCT/EP2020/058746, filed Mar. 27, 2020, which designated the United States; this application also claims the priority, under 35 U.S.C. § 119, of German patent application DE 10 2019 205 764.0, filed Apr. 23, 2019; the prior applications are herewith incorporated by reference in their entirety.

FIELD AND BACKGROUND OF THE INVENTION

The invention relates to a processing system and a method for performing track work.

German published patent application DE 10 2016 000 408 A1 discloses a maintenance vehicle which has an industrial robot with at least three movement axes for performing track work. The industrial robot is displaceably mounted on a robot guide which is fastened to the vehicle frame of the maintenance vehicle. The industrial robot is arranged between side walls of the maintenance vehicle, which bound a working space for performing track work.

A work train for producing a track is known from Australian published patent application AU 2017 204 414 A1. The work train comprises a work vehicle with a work compartment in which a multi-axis robot is arranged.

SUMMARY OF THE INVENTION

The invention is based on an object of creating a processing system for performing track work, which can be used simply, flexibly, safely and reliably.

This object may be achieved by a processing system for performing track work with at least one multi-axis robot, comprising an enclosure in the form of a container for receiving the at least multi-axis robot and comprising at least one displacement device for displacing the at least one multi-axis robot between a transport position inside the enclosure and a working position outside the enclosure. For the automated performance of track work, the processing system has a multi-axis robot. The multi-axis robot is designed, for example, as an industrial robot. In a transport position, the multi-axis robot is arranged inside an enclosure, whereas in a working position, the multi-axis robot is arranged outside the enclosure. The enclosure is designed as a container, in particular as a standard container, a shipping container, or ISO container. In particular, the container is made of metal. For displacing the multi-axis robot between the transport position and the working position, the processing system comprises a displacement device.

In the transport position, the multi-axis robot and in particular also the displacement device are arranged inside the enclosure so that the processing system appears as an enclosure and has the dimensions of the enclosure. The processing system can thus be transported easily, flexibly, safely and reliably to the location of the track work or to a place of use. For this purpose, the processing system is fastened to a vehicle, for example a rail vehicle or a road vehicle, or to a freight car or freight trailer, for example, like a usual standard container. During transport, the multi-axis robot is protected from environmental influences inside the enclosure.

At the place of use, the multi-axis robot is transferred from the transport position to the working position outside the enclosure by means of the displacement device. In the working position, the multi-axis robot may perform a wide variety of track work in a simple, flexible and reliable manner. The multi-axis robot may, for example, perform maintenance work and/or servicing work on the track system. For this purpose, the processing system may, for example, remain on the vehicle or freight car or freight trailer or be unloaded and placed at a fixed location at the place of use. If the track work has to be interrupted, the multi-axis robot can be moved from the working position back to the transport position inside the enclosure at any time by means of the displacement device, so that the processing system is in a secured state. After completion of the track work, the multi-axis robot is transferred back to the transport position by means of the displacement device and transported away from the place of use.

The displacement device is preferably fastened to the enclosure. In particular, the displacement device is fastened to the enclosure in an interior space of the latter. In the transport position, the displacement device is preferably arranged inside the enclosure, whereas in the working position, the displacement device is arranged partly inside and partly outside the enclosure. The multi-axis robot is fastened to the displacement device. For example, the multi-axis robot is fastened to the displacement device in a horizontal position or a vertical position. For example, the multi-axis robot is fastened in a standing or hanging position. Preferably, the multi-axis robot has at least three, in particular at least four, in particular at least five, and in particular at least six movement axes. In particular, the multi-axis robot has at least three movement axes and at most six movement axes. The movement axes are designed in particular as swivel axes.

The processing system may comprise one enclosure or several enclosures. This allows a modular structure of the processing system. The displacement device and the multi-axis robot are arranged in particular in a first enclosure, whereas additional components may be arranged in the first enclosure and/or a second enclosure. For example, the displacement device and the multi-axis robot are arranged in a first enclosure and a power supply is arranged in a second enclosure. Preferably, all enclosures have dimensions and/or interfaces according to a standard, in particular according to ISO standard.

The processing system comprises at least one multi-axis robot. For example, the processing system comprises at least two, in particular at least three multi-axis robots. Furthermore, the processing system has at least one displacement device for displacing the at least one multi-axis robot between the transport position and the working position. If the processing system has a plurality of multi-axis robots, these may be arranged on a common displacement device or can each be arranged on a displacement device. Preferably, each multi-axis robot is arranged on a respective associated displacement device, i.e. its own displacement device. If the processing system has a plurality of multi-axis robots, these are preferably arranged in a common enclosure in the transport position. The multi-axis robots and/or the displacement devices may have the same and/or different structures.

For example, the processing system may comprise a first multi-axis robot disposed on a first displacement device and a second multi-axis robot disposed on a second displacement device. The enclosure includes a first enclosure opening for passing the first multi-axis robot therethrough, and a second enclosure opening for passing the second multi-axis robot therethrough. The enclosure openings are preferably formed on different sides of the enclosure.

A processing system in which the enclosure comprises at least one enclosure opening for passing through the at least one multi-axis robot, ensures a simple, flexible, safe and reliable performance of track work. The at least one enclosure opening enables easy displacing of the multi-axis robot between the transport position and the working position. The enclosure delimits an interior space and separates it from an exterior space. The at least one enclosure opening provides a connection between the interior space and the exterior space, so that the multi-axis robot can be easily displaced between the interior space and the exterior space. For example, the at least one enclosure opening may be opened or closed as required and/or be permanently open by means of an associated covering element. Preferably, the enclosure has two opposing long sides, two opposing short sides, a bottom side and an opposing upper side. Preferably, the at least one enclosure opening is formed on a short side and/or on a long side and/or on the upper side of the enclosure.

A processing system in which the enclosure opening is formed on a short side and/or on a long side and/or on an upper side of the enclosure, ensures a simple, flexible, safe and reliable performance of track work. The enclosure has two opposing long sides, two opposing short sides, an underside and an opposing upper side. The at least one enclosure opening is formed on at least one short side and/or at least one long side and/or on the upper side, depending on the track work to be performed. Preferably, the at least one enclosure opening is formed on a short side. Since the enclosure is formed as a container, no enclosure opening for passing the at least one multi-axis robot is formed at the underside of the enclosure.

A processing system in which the enclosure comprises a plurality of walls and at least one covering element, displaceable relative to the walls, for opening and closing at least one enclosure opening, ensures a simple, flexible, safe and reliable performance of track work. By means of the at least one covering element, the at least one enclosure opening may be closed in the transport position and opened for transferring the multi-axis robot from the transport position to the working position. The multi-axis robot and the displacement device are thus protected in the enclosure in the transport position. The at least one covering element may be opened in a simple manner so as to expose the at least one enclosure opening for passaging through the multi-axis robot. The at least one covering element may be actuated, for example, manually and/or by means of a drive. In particular, the at least one enclosure opening is arranged at a short side and/or a long side and/or an upper side of the enclosure. The at least one covering element is designed, for example, as a cover flap, as a single-part or multi-part door, as a roller shutter and/or as a sectional door.

A processing system in which a plurality of fastening elements for fastening the enclosure to a chassis are arranged at the enclosure, ensures a simple, flexible, safe and reliable performance of track work. By means of the fastening elements, the enclosure may be reversibly fastened to a chassis. The processing system may thereby be easily, safely and reliably transported to the place of use. By loosening the fastening elements, the enclosure may be separated from the chassis again so that the processing system does not have to remain on the chassis at the place of use or during storage. The chassis may then be used elsewhere, for example for transporting goods by means of containers. Preferably, the fastening elements are each part of a rotary connection. The respective rotary connection serves to form a form-fit connection between the enclosure or the container and the chassis. The form-fit connection is locked or unlocked by rotating the respective fastening element and a counter fastening element relative to each other. The counter fastening elements are fastened to the chassis. Such rotary connections are known as twistlock connections.

A processing system in which the at least one displacement device configures at least one linear axis for linearly displacing the at least one multi-axis robot, ensures a simple, flexible, safe and reliable performance of track work. Due to the fact that the displacement device forms at least one linear axis, the multi-axis robot may be displaced in a simple manner between the transport position and the working position. In particular, the displacement device has a linear guide and a slide guided thereon. The displacement device can preferably be actuated by means of a drive. The at least one linear axis runs in particular in a horizontal direction and/or in a vertical direction. Preferably, the at least one linear axis runs parallel to long sides of the enclosure. The displacement device comprises, for example, a mounting element which is designed as a cuboid frame. In particular, the mounting element is guided on at least two sides of the enclosure by means of a linear guide. Preferably, the linear guide guides the mounting element inside the enclosure and/or on opposite sides, for example on the underside and on the upper side and/or on the opposite long sides. In particular, the cuboidal frame is formed in a grid-like manner by longitudinal struts, transverse struts and vertical struts. The mounting element serves for fastening the at least one multi-axis robot. Preferably, the at least one displacement device forms at least two linear axes for horizontally displacing and/or vertically displacing the at least one multi-axis robot.

A processing system in which the at least one displacement device configures at least one swivel axis for swiveling the at least one multi-axis robot, ensures a simple, flexible, safe and reliable performance of track work. The at least one swivel axis preferably runs parallel to a horizontal direction and/or parallel to a vertical direction. For forming the at least one swivel axis, the displacement device has, in particular, a turntable and/or a swivel bridge to which the multi-axis robot is fastened. The multi-axis robot can be swiveled about the at least one swivel axis, for example, manually or by means of a drive. By forming at least one swivel axis, the processing system has a high degree of flexibility in performing track work.

A processing system in which the at least one displacement device comprises a mounting element to which the at least one multi-axis robot is fastened and which is displaceable relative to the enclosure, ensures a simple, flexible, safe and reliable performance of track work. The multi-axis robot is fastened to the mounting element. The mounting element is displaceable relative to the enclosure, so that the multi-axis robot is displaceable in a simple and flexible manner between the transport position and the working position. The mounting element is preferably linearly displaceable and/or can be swiveled about a swivel axis.

For example, the mounting element configures a platform on which the multi-axis robot is mounted. The mounting element is, for example, a slide, a lifting platform, a turntable or a swivel bridge. The slide is L-shaped in cross-section, for example, so that the multi-axis robot is fastened to the slide in a horizontal position.

The mounting element is preferably cuboid-shaped, for example as a cuboid-shaped frame. The cuboid frame is formed in a grid-like manner, for example, by longitudinal struts, transverse struts and vertical struts. The mounting element defines a working space in which the at least one multi-axis robot is arranged. The at least one multi-axis robot is arranged in particular in a suspended manner in the working space. Preferably, the mounting element defines a mounting plane running parallel to the upper side and/or to the underside of the enclosure, wherein a first movement axis of the multi-axis robot runs perpendicularly to the mounting plane.

A processing system in which the at least one displacement device is lockable in the transport position and/or in the working position, ensures a simple, flexible, safe and reliable performance of track work. By locking the displacement device, the multi-axis robot is secured in the transport position and/or in the working position. The displacement device, for example, can be locked manually and/or automatically.

A processing system in which the at least one displacement device comprises at least one supporting element for the support on a track, ensures a simple, flexible, safe and reliable performance of track work. The at least one displacement device comprises a mounting element on which the at least one multi-axis robot is arranged. The at least one supporting element serves for supporting the mounting element on the track. In a working position, the mounting element is displaced from the enclosure by means of a linear guide. A first end of the mounting element hangs freely in the working position, whereas an opposite second end is held in the linear guide. The at least one supporting element serves for supporting the free end of the mounting element on the track. The at least one supporting element is displaceable relative to the mounting element, in particular linearly displaceable. As a result, the at least one supporting element may be transferred from a compact transport position within the enclosure to a working position for supporting the mounting element. Preferably, the at least one displacement device comprises two supporting elements which support the mounting element in the region of the rails. In particular, the at least one supporting element comprises a guide roller for supporting the mounting element on a rail during the displacement of the mounting element between the transport position and the working position. The respective supporting element is preferably displaceable by means of a drive. The at least one supporting element stabilizes the displacement device in the working position so that the at least one multi-axis robot may perform the track work without vibrations or oscillations.

A processing system in which a tool magazine is arranged in the enclosure ensures a simple and flexible performance of track work. Due to the fact that a tool magazine is arranged in the enclosure, suitable tools are available to the multi-axis robot for carrying out various track work. The processing system thus enables an automatic tool change. The automatic tool change may be performed in such a way that the multi-axis robot automatically deposits a tool that is no longer required in the tool magazine and/or automatically grips a required tool from the tool magazine. If required, a tool changer may be arranged in the enclosure in addition to the tool magazine. In this case, the tool changer transfers a tool that is no longer required from the multi-axis robot to the tool magazine and deposits it in the tool magazine. Accordingly, the tool changer removes a required tool from the tool magazine and transfers it to the multi-axis robot. The tool magazine and/or the tool changer is preferably linearly displaceable, in particular parallel to long sides of the enclosure.

A processing system comprising a dry ice supply unit for treating surfaces, ensures a simple, flexible and reliable performance of track work. The dry ice supply unit enables treatment, in particular cleaning, of surfaces. The dry ice supply unit comprises as a tool at least one treatment nozzle, which may be arranged at or held by the multi-axis robot. The at least one treatment nozzle is provided in a tool magazine, for example. The dry ice supply unit is arranged in the enclosure and/or in an additional enclosure. For example, a $CO_2$ storage enclosure, a pelletizer and a dry ice storage enclosure are arranged in the additional enclosure such that dry ice pellets are provided in the dry ice storage enclosure. For example, a compressed air generator and a proportioner are arranged in the additional enclosure to generate a dry ice-compressed air mixture from the dry ice pellets and compressed air. The dry ice-compressed air mixture is fed from the additional enclosure into the enclosure via a feed line. The feed line is connected with the at least one treatment nozzle. The additional enclosure is in particular a container, for example a standard container or an ISO container. Preferably, the additional enclosure is designed according to the enclosure.

A processing system comprising an energy generator and/or an energy storage, ensures a simple, flexible and reliable performance of track work. Due to the fact that the processing system comprises an energy generator and/or an energy storage means that the processing system can be operated largely autonomously. The processing system can thus be operated independently of an external energy supply. The energy generator serves in particular to provide electric energy. Preferably, the energy generator comprises a power unit with a drive operable by means of a fuel and a power generator driven thereby. The energy storage is designed in particular as an accumulator. The energy generator and/or the energy storage may be arranged in the enclosure and/or in an additional enclosure. The additional enclosure is in particular a container, for example a standard container or an ISO container. Preferably, the additional enclosure is designed according to the enclosure.

A processing system comprising at least one sensor for controlling the at least one multi-axis robot and/or monitoring a working space, ensures a simple, flexible, safe and reliable performance of track work. The at least one sensor is arranged in particular at the multi-axis robot and/or at the enclosure and/or on the displacement device. Preferably, the at least one sensor is configured as an optical sensor and/or optical detector. For example, the at least one sensor is a radar sensor and/or a laser scanner and/or a camera. In particular, the at least one sensor serves for detecting the object to be processed and/or for controlling or positioning the multi-axis robot and/or for monitoring a working space.

A processing system comprising a control unit for controlling the at least one multi-axis robot, ensures a simple, flexible, safe and reliable performance of track work. The control unit is preferably in signal communication with the multi-axis robot and/or the displacement device and/or at least one sensor and/or a tool changer and/or an energy generator and/or an energy storage and/or a dry ice supply unit. The control unit may be arranged in the enclosure and/or an additional enclosure. In particular, the additional enclosure is a container, for example a standard container or an ISO container. Preferably, the additional enclosure is designed according to the enclosure.

A processing system comprising at least one protective element for the protection against environmental influences and/or for delimiting a working space, ensures a simple, flexible, safe and reliable performance of track work. The at least one protective element serves, for example, for protecting against environmental influences and/or for delimiting a working space in order to avoid a danger to persons. Preferably, the at least one protective element is arranged at the enclosure and/or at the displacement device. Preferably, the at least one protective element is displaceable relative to the enclosure and/or to the displacement device. For example, the at least one protective element is arranged inside the enclosure in a transport position and is arranged at least partly outside the enclosure in a working position. Preferably, the at least one protective element surrounds the working space in which the at least one multi-axis robot is arranged. In particular, the at least one protective element is arranged on a cuboid-shaped mounting element and surrounds a working space on at least two long sides, on at least one short side and on an upper side. Preferably, at least one protective element is displaceably arranged on a mounting element of the displacement device. The at least one protective element is displaceable relative to the displacement device or relative to the mounting element between a transport position and a working position. In the transport position, the at least one protective element is arranged within the enclosure. In a working position, the at least one protective element is displaced such that the working space between the displacement device and the track is delimited. Preferably, at least two protective elements, which are U-shaped, are arranged at the displacement device. As a result, the working space between the displacement device and the track may be delimited on all sides. The at least one protective element is in particular designed to be opaque.

A processing system comprising a first multi-axis robot and a second multi-axis robot for buildup welding and/or joint welding, ensures a simple, flexible, safe and reliable performance of track work. The first multi-axis robot serves for performing preparatory work and/or finishing work in connection with buildup welding and/or with joint welding. The first multi-axis robot, for example, serves for grinding and/or milling a rail. The second multi-axis robot serves for buildup welding on a rail and/or for joint welding of two rails or rail sections. In a tool receptacle of the first multi-axis robot, for example, a grinding tool and/or a milling tool is accommodated in a rotationally drivable manner. A welding head, for example, is accommodated in a tool receptacle of the second multi-axis robot. The welding head is in communication with a welding device. The welding device is arranged in particular at the displacement device or at the mounting element. The multi-axis robots enable an automated joint welding and/or buildup welding.

The invention is further based on an object of creating a processing device for performing track work that can be used simply, flexibly, safely and reliably.

This object may be achieved by a processing device for performing track work comprising a chassis and a processing system according to the embodiments of the invention, which is arranged on the chassis. Due to the fact that the processing system according to the invention is arranged on a chassis, the at least one processing system can be transported easily, flexibly, safely and reliably to the place of use and can be transported away from it again. Preferably, the at least one processing system is reversibly fastened to the chassis. The at least one processing system can thus be fastened to the chassis and detached from it again. As a result, the at least one processing system may be dismounted from the chassis if required and the chassis may be used elsewhere. The chassis is, for example, part of a rail vehicle, a road vehicle, an off-road vehicle such as a tracked vehicle or a walking excavator, a rail-bound flat car or freight car and/or a trailer or semitrailer.

The invention is also based on an object of creating a method which enables track work to be carried out simply, flexibly, safely and reliably.

This object may be achieved by a method for performing track work comprising the steps of: providing a processing system according to the embodiments of the invention, transporting the processing system to a track location to be processed, wherein the at least one multi-axis robot is located inside the enclosure in the transport position, transferring the at least one multi-axis robot from the transport position to the working position outside the enclosure by means of the at least one displacement device, and performing the track work by means of the at least one multi-axis robot. The advantages of the method according to the invention correspond to the advantages of the processing system according to the invention already described. The method according to the invention may in particular also be further developed by providing a processing device, as claimed. The processing system may be unloaded from the chassis or remain on the chassis after being transported to the track location or place of use to be processed. After performing the track work, the multi-axis robot is transferred from the working position back to the transport position and transported away from the track location or place of use being processed. If necessary, the at least one processing system is reloaded onto a chassis. Preferably, the at least one displacement device is supported on the track in the working position by means of at least one supporting element.

Further features, advantages and details of the invention will be apparent from the following description of several embodiments.

DETAILED DESCRIPTION OF THE INVENTION

Figure 1:
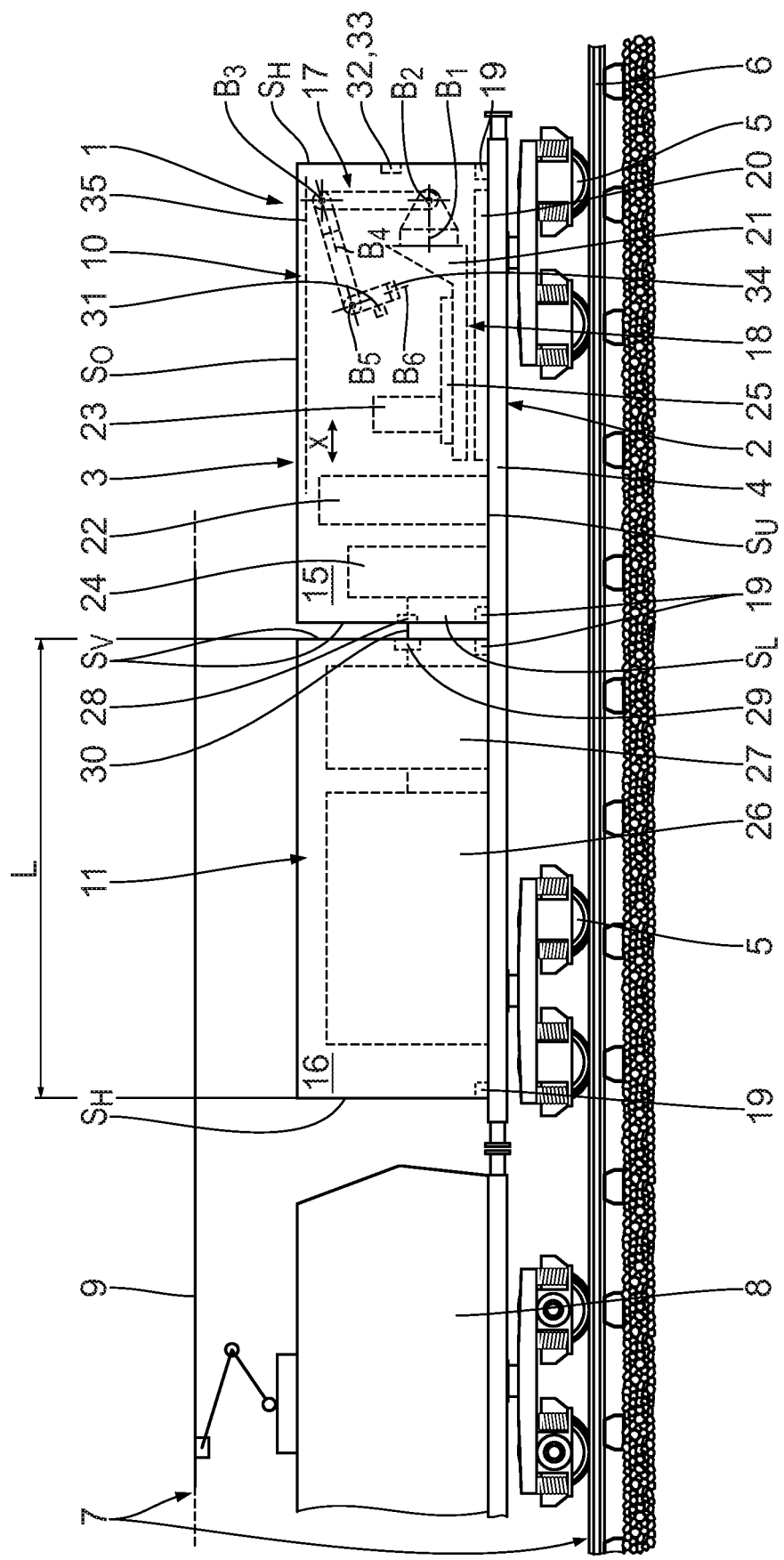
FIG. 1 shows a side view of a processing device for performing track work according to a first embodiment with a processing system arranged on a flat car in a transport state.

A first embodiment of the invention is described below with reference to FIGS. 1 to 3. A processing device 1 for performing track work comprises a rail-mounted flat car 2 to which a processing system 3 is fastened. The flat car 2 comprises a chassis 4 on which a plurality of axles with wheels 5 attached thereto are rotatably mounted. The wheels 5 are guided on rails 6 of a track system 7. The processing device 1 is coupled to a rail vehicle 8 in the transport state shown in FIG. 1. The rail vehicle 8 can be operated electrically and is supplied with electric energy via an overhead line 9 of the track system 7.

The processing system 3 comprises a first enclosure 10 and a second enclosure 11. The enclosures 10, 11 are designed as standard containers or ISO containers. The enclosures 10, 11 each have an underside $S_U$, an upper side $S_O$, two opposite long sides $S_L$, $S_R$ and two opposite short sides $S_V$, $S_H$. The underside $S_U$, the upper side $S_O$ and the sides $S_L$, $S_R$ and $S_V$ are configured by solid walls 12, whereas the side $S_H$ is configured by a covering element 13 in the form of a two-part door. The covering element 13 is displaceable relative to the walls 12. The covering element 13 may be opened or closed so that the covering element 13 exposes or closes an enclosure opening 14.

The enclosures 10, 11 have a length L, a width B and a height H. For the length L: 280 cm≤L≤1,700 cm, in particular cm 500≤L≤1,300 cm, and in particular 600 cm≤L≤610 cm. For the width B: 100 cm≤B≤300 cm, in particular 200 cm≤B≤280 cm, and in particular 240 cm≤B≤250 cm. For the height H, 100 cm≤H≤300 cm, in particular 180 cm≤H≤290 cm, and in particular 250 cm≤H≤280 cm. The first enclosure 10 bounds a first interior space 15. Correspondingly, the second enclosure 11 bounds a second interior space 16. The enclosures 10, 11, in the region of the underside Su, have a plurality of fastening elements 19 which interact with counter-fastening elements of the flat wagon 2 for fastening to the chassis 4. The counter-fastening elements are not shown in more detail.

The processing system 3 comprises a multi-axis robot 17 and an associated displacement device 18 for performing track work. The multi-axis robot 17 is arranged at the displacement device 18 such that the multi-axis robot 17 can be displaced from a transport position in the interior space 15 through the open enclosure opening 14 to a working position outside the interior space 15.

The multi-axis robot 17 is designed as an industrial robot. The multi-axis robot 17 has six movement axes, which are designated in detail as $B_1$ to $B_6$. The design of the multi-axis robot 17 is known and usual.

The displacement device 18 comprises a guide 20 and a mounting element 21 configured as a slide. The guide 20 is fastened to the enclosure 10 in the interior space 15 in the region of the underside $S_U$. The guide 20 is arranged adjacent to the enclosure opening 14. The guide 20 is designed as a linear guide. The displacement device 18 thus has a linear axis x. The mounting element 21 can be displaced along the linear axis x on the guide 20 by means of a drive which is not shown in greater detail. The mounting element 21 is L-shaped in cross-section and has a long leg and a short leg. In the region of the long leg, the mounting element 21 is mounted on the guide 20, whereas the short leg extends essentially perpendicularly to the long leg and the guide 20. In the region of the short leg, the multi-axis robot 17 is fastened to the mounting element 21 in a substantially horizontal position.

Figure 2:
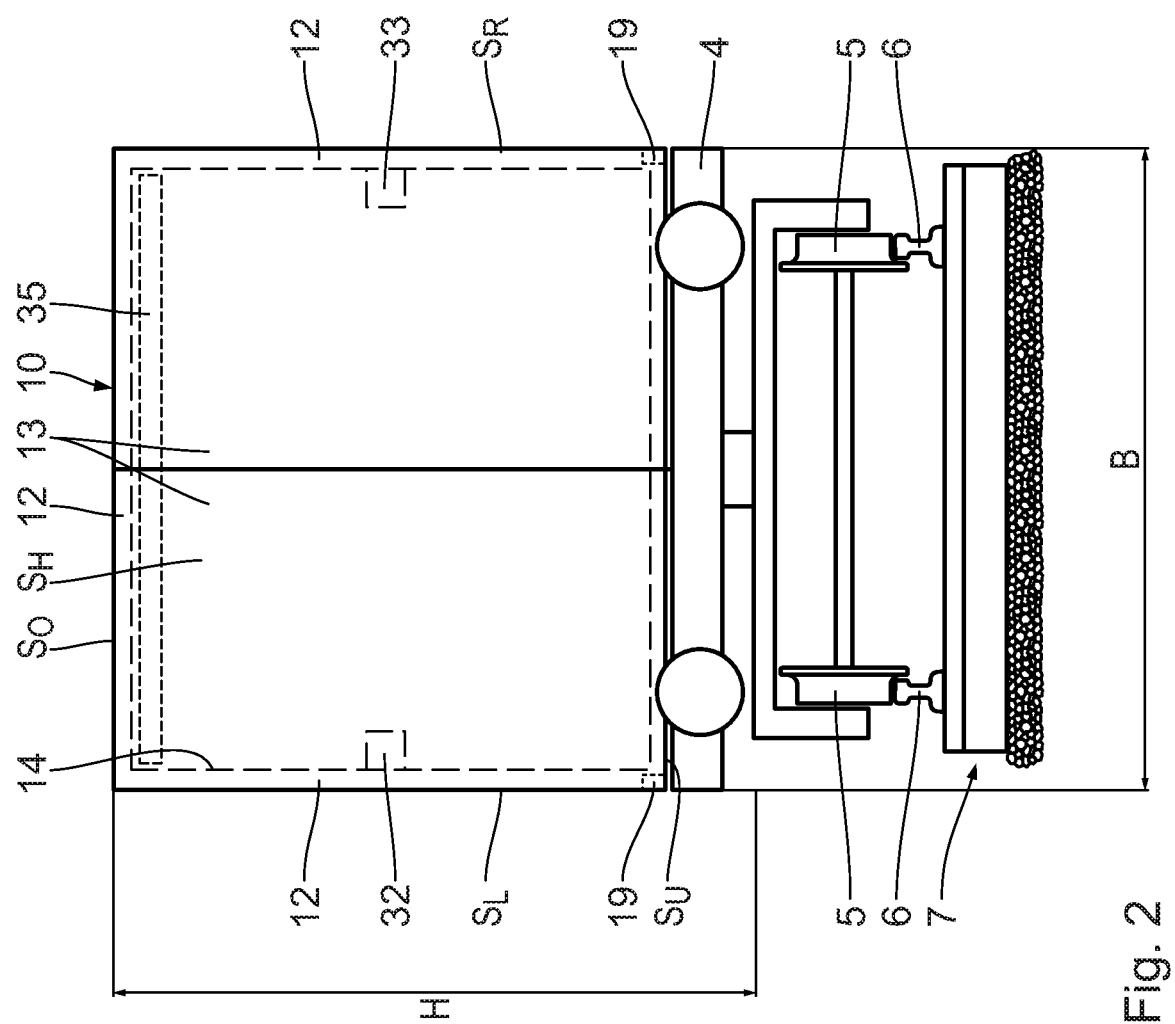
FIG. 2 shows a rear view of the processing device in FIG. 1.

The multi-axis robot 17 and the displacement device 18 are in a transport position in the transport state of the processing device 1 shown in FIG. 1. In the transport position, the multi-axis robot 17 and the displacement device 18 are arranged completely in the interior space 15, so that the enclosure 10 can be closed by means of the covering element 13. The displacement device 18 can be locked in the transport position.

The processing system 3 further comprises a tool magazine 22 with an associated tool changer 23 for performing an automatic tool change and a control unit 24. The tool magazine 22 and the tool changer 23 are arranged in the interior space 15. The tool magazine 22 is fastened to the enclosure 10 in the region of the underside $S_U$. On the other hand, the tool changer 23 is arranged on a tool changer slide 25, which is arranged in a linearly displaceable manner on the mounting element 21. The tool changer 23 is linearly displaceable in the direction of the linear axis x between the tool magazine 22 and the multi-axis robot 17 by means of a drive not shown in more detail.

The processing system 3 further comprises an energy generator 26 and an energy storage 27 for providing electric energy. The energy generator 26 and the energy storage 27 are arranged in the interior space 16 of the second enclosure 11. The energy generator 26 comprises, for example, a power unit having a drive operable by means of a fuel and a power generator driven thereby. The energy storage 27 is designed, for example, as an accumulator.

The first enclosure 10 has a first connection 28 and the second enclosure 11 has a second connection 29 for transmitting electric energy. The connections 28, 29 are connected to each other via a supply line 30, so that the part of the processing system 3 arranged in the enclosure 10 is supplied with electric energy. An external supply line may alternatively be connected to the connection 28, so that an external power supply is made possible. In this case, the enclosure 11 with the energy generator 26 and the energy storage 27 is not required.

For controlling the multi-axis robot 17 and for monitoring a working space A of the multi-axis robot 17, the processing system 3 has sensors 31, 32, 33. A first sensor 31 is configured as a camera. The first sensor 31 is arranged in the region of a tool receptacle 34 of the multi-axis robot 17. A second sensor 32 and a third sensor 33 are designed as a camera. The sensors 32, 33 are arranged in the region of the enclosure opening 14 in the interior space 15 of the enclosure 10. The sensors 31, 32, 33 are in signal communication with the control unit 24.

To protect a working space A from environmental influences, the processing system 3 has a protective element 35. The working space A is defined by the movement range of the multi-axis robot 17. The protective element 35 is plate-shaped and is mounted in a linearly displaceable manner on the enclosure 10 in the region of the upper side So. The protective element 35 can be displaced manually or by means of a drive.

Figure 3:
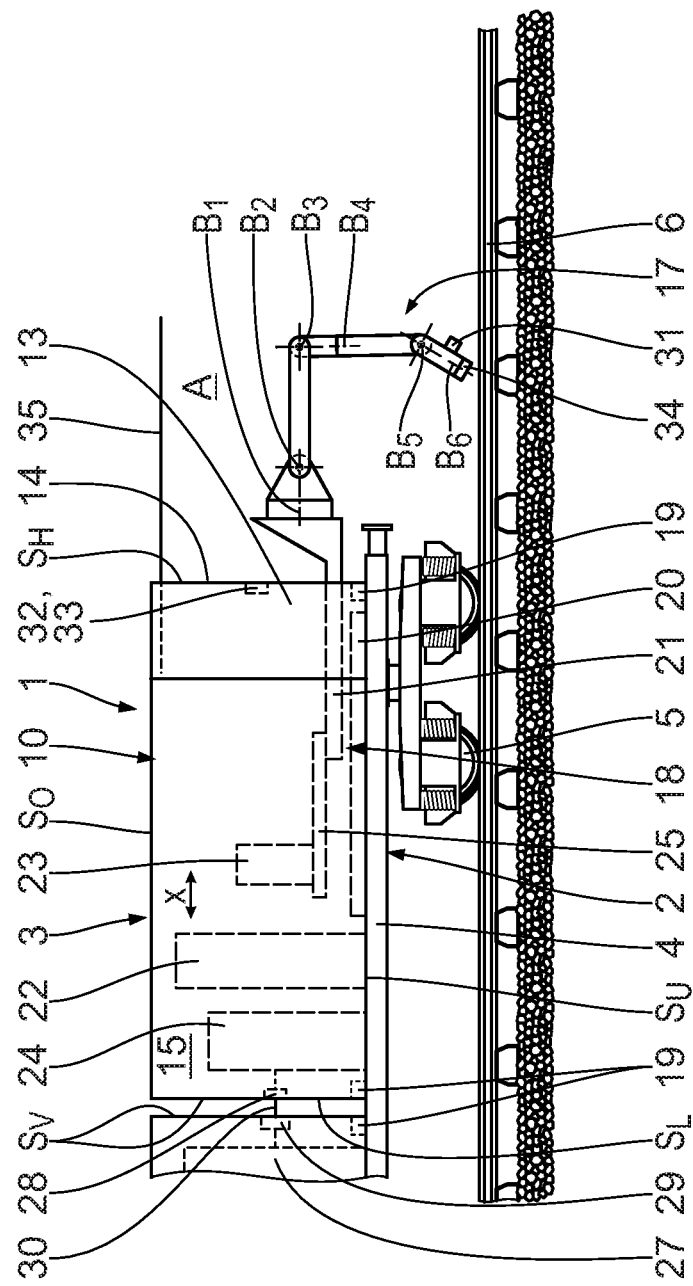
FIG. 3 shows a side view of the processing device according to FIG. 1 in a working state of the processing system.

FIG. 3 shows the processing system 3 at a place of use or at a track location to be processed in a working state. The multi-axis robot 17 and the displacement device 18 are in a working position. The displacement device 18 is lockable in the working position. In the working position, the multi-axis robot 17 is no longer in the interior space 15, but in an exterior space of the enclosure 10.

The operating principle of the processing device 1 is described below:

Initially, the processing device 1 is in the transport state shown in FIG. 1. The multi-axis robot 17 and the displacement device 18 as well as the protective element 35 are arranged completely inside the enclosure 10. The enclosures 10, 11 are closed by means of the respective covering element 13. In the transport state, the processing system 3 externally appears as two enclosures 10, 11.

The processing device 1 is coupled to the rail vehicle 8 and is transported by means of same to a desired place of use or a track location to be processed. At the place of use, the processing device 1 or processing system 3 is transferred from the transport state to the working state shown in FIG. 3. For this purpose, the covering element 13 of the enclosure 10 is first opened. The mounting element 21 is moved linearly on the guide 20 along the linear axis x, so that the displacement device 18 is transferred from a transport position to a working position. The displacement device 18 is locked in the working position. The multi-axis robot 17 fastened to the mounting element 21 is correspondingly transferred from a transport position to a working position. In the working position, the multi-axis robot 17 is located outside the enclosure 10. The protective element 35 is linearly displaced in the working position so that it at least partially shields the working space A.

The multi-axis robot 17 may now be used to perform track work, for example to process the rails 6. For this purpose, a tool not shown in more detail is located in the tool receptacle 34. The first sensor 31 detects, for example, the rail 6 to be processed, so that the multi-axis robot 17 may be controlled in the desired manner by means of the control unit 24. The sensors 32, 33 monitor the working space A. If, for example, a person enters the working space A, this is detected by the sensors 32, 33 and recognized by the control unit 24, so that the control unit 24 stops the multi-axis robot 17.

When a tool change is required, the tool changer 23 takes the required tool from the tool magazine 22. The tool changer 23 is then moved linearly in the direction of the multi-axis robot 17 by means of the tool changer slide 25. The multi-axis robot 17 deposits the tool that is no longer required in the tool changer 23 and removes the required tool from the tool changer 23. The multi-axis robot 17 can then continue processing. The tool changer 23 is again moved linearly in the direction of the tool magazine 22 and deposits the tool that is no longer required in the tool magazine 22.

When the track work is completed, the multi-axis robot 17 and the displacement device 18 are moved back to the transport position. The displacement device 18 is locked in the transport position. The protective element 35 is displaced into the enclosure 10. Subsequently, the covering element 13 of the enclosure 10 is closed so that the enclosure opening 14 is closed. The processing device 1 may now be transported away by means of the rail vehicle 8.

Figure 4:
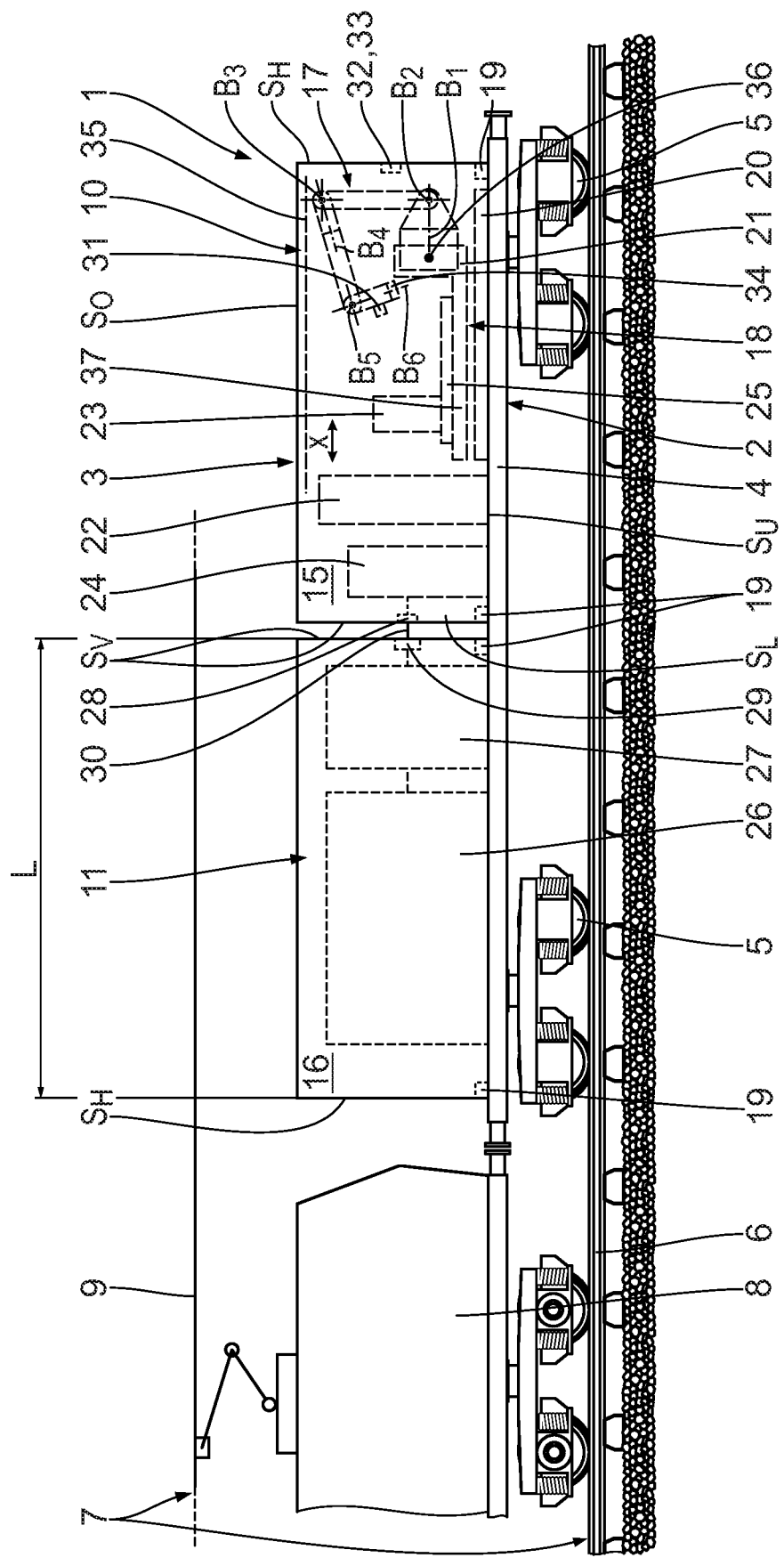
FIG. 4 shows a side view of a processing device according to a second embodiment in a transport state.

A second embodiment of the invention is described below with reference to FIG. 4. In contrast to the first embodiment, the displacement device 18 additionally has a swivel axis 36 for swiveling the multi-axis robot 17. The multi-axis robot 17 can be swiveled about the horizontally extending swivel axis 36, so that the multi-axis robot 17 is swiveled from a horizontal position to a vertical position. By swiveling about the swivel axis 36, the movement axis $B_1$ may thus be transferred from the horizontal position shown in FIG. 4 to a vertical position. For this purpose, the mounting element 21 is designed as a swivel bridge. The mounting element 21 is part of the displacement device 18 and is mounted in a swiveling manner on the slide 37 of the displacement device 18. By swiveling into a vertical position, the multi-axis robot 17 may reach the overhead line 9. This allows maintenance and/or inspection work to be carried out on the overhead line 9. With regard to the further structure and the further operating principle, reference is made to the first embodiment.

Figure 5:
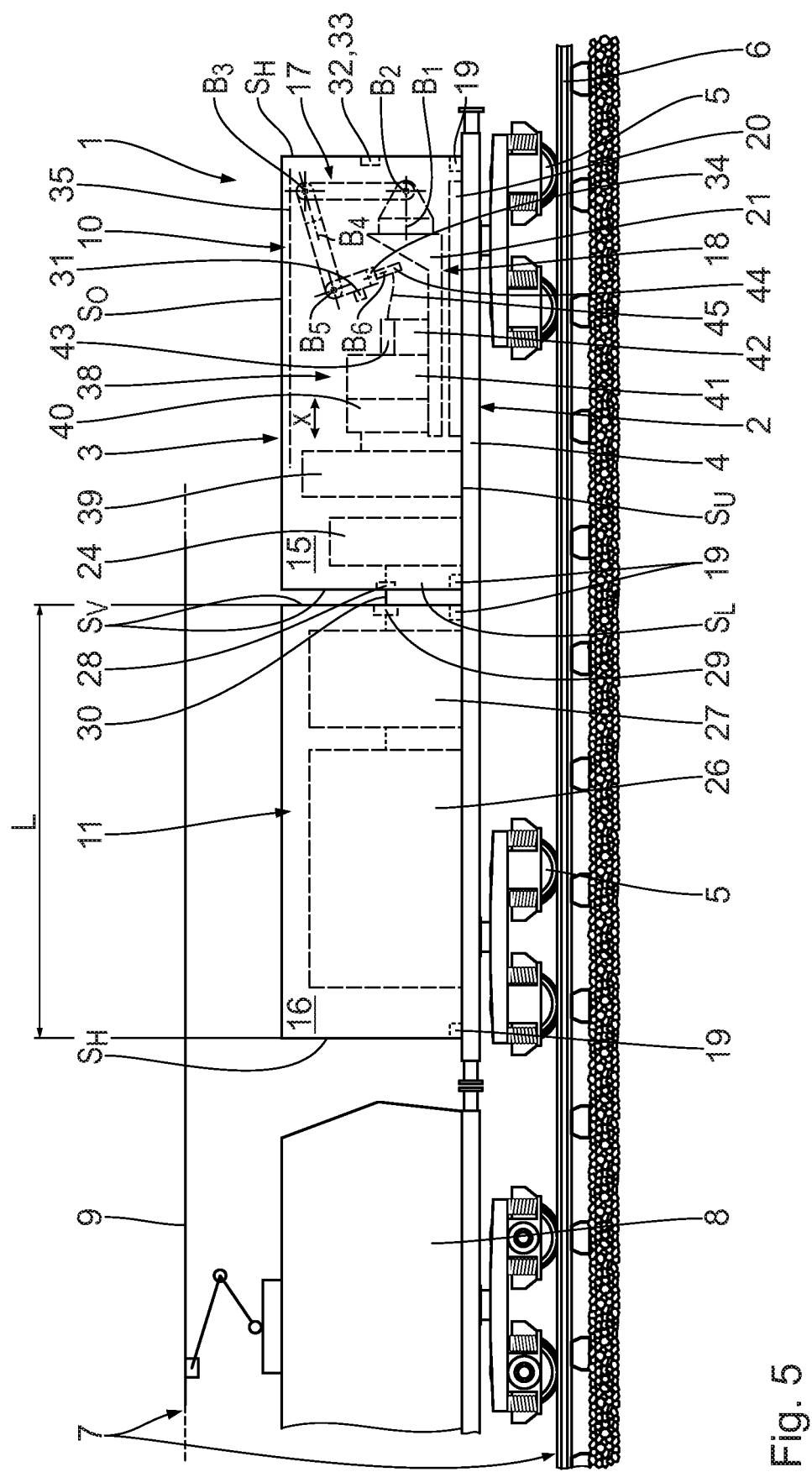
FIG. 5 shows a side view of a processing device according to a third embodiment in a transport state.

A third embodiment of the invention is described below with reference to FIG. 5. In contrast to the preceding embodiments, the processing system 3 has a dry ice supply unit 38. The dry ice supply unit 38 comprises a $CO_2$ storage enclosure 39, a pelletizer 40, a dry ice storage enclosure 41, a compressed air generator 42, and a proportioner 43. The $CO_2$ storage enclosure 39 is fastened in the enclosure 10. The pelletizer 40, the dry ice storage enclosure 41, the compressed air generator 42 and the proportioner 43 are fastened to the mounting element 21, which is designed as a slide. The pelletizer 40 is supplied with liquid $CO_2$ from the $CO_2$ storage enclosure 39 via a supply line and produces dry ice pellets, which are stored in the dry ice storage enclosure 41. The compressed air generator 42 provides compressed air so that a dry ice-compressed air mixture is provided by means of the proportioner 43. The dry ice supply unit 38 further comprises a treatment nozzle 44 which is arranged in the tool receptacle 34 and guided by means of the multi-axis robot 17. The treatment nozzle 44 is connected with the proportioner 43 via a mixture line 45. The mixture line 45 is designed as a flexible tube. In particular, the mixture line 45 is mounted so that it can be rolled up and unrolled and can thus be flexibly adapted to the movement of the multi-axis robot 17. By means of the treatment nozzle 44, the dry ice-compressed air mixture may be discharged for the treatment of surfaces. With regard to the further structure and the further operating principle, reference is made to the preceding embodiments.

A fourth embodiment of the invention is described below with reference to FIGS. 6 to 10. The processing system 3 comprises a first multi-axis robot 17 for grinding and/or milling the rails 6 and a second multi-axis robot 17' for welding, in particular for buildup welding and/or joint welding.

The mounting element 21 is formed as a cuboid frame. The mounting element 21 comprises longitudinal struts 46 running in an x-direction, transverse struts 47 running in a y-direction and vertical struts 48 running in a z-direction. The x-direction, the y-direction and the z-direction run perpendicularly to each other in pairs and form a Cartesian coordinate system. The guide 20 is designed as a linear guide. The guide has a cuboid base frame 49, which is fastened to the enclosure 10 in the interior space 15. Guide elements 50 for linear guiding of the mounting element 21 are arranged on the base frame 49 on the upper side $S_O$ and on the underside $S_U$. The guide elements 50 are designed, for example, as guide rollers. For linear displacement of the mounting element 21, the guide elements 50 can be driven in rotation, for example, by means of a drive not shown in more detail.

The mounting element 21 delimits an interior space 51 in which the multi-axis robots 17, 17' are arranged. The first multi-axis robot 17 is suspended from the mounting element 21. For this purpose, the mounting element 21 forms a mounting plane $E_1$ running parallel to an x-y plane. The first movement axis $B_1$ of the multi-axis robot 17 runs perpendicularly to the mounting plane $E_1$.

The second multi-axis robot 17' is arranged in the x-direction between the first multi-axis robot 17 and the short side $S_V$ of the enclosure 10. The second multi-axis robot 17' is fastened to a linear guide 52 and can be displaced linearly in a plane $E_2$ by means of the latter. The plane $E_2$ encloses an angle $\alpha$ with the plane $E_1$, where: $0° < \alpha \leq 90°$. The second multi-axis robot 17' has six movement axes $B_1$ to $B_6$ corresponding to the first multi-axis robot 17.

For processing a rail 6, a grinding tool and/or a milling tool is accommodated in the tool receptacle 34 of the first multi-axis robot 17. In order to perform a tool change, the tool magazine 22 is fastened to the mounting element 21.

A welding head is arranged in the tool receptacle 34 of the second multi-axis robot 17'. The welding head is part of a welding device 53 that is fastened to the mounting element 21.

For supporting in the working position, the displacement device 18 comprises supporting elements 54. The mounting element 21 comprises a first end which is disposed away from the enclosure 10 in the working position and a second end remaining within the enclosure 10 in the working position. The supporting elements 54 are arranged at the first end. The supporting elements 54 are displaceable in the z-direction relative to the mounting element 21. The supporting elements 54 are retractable and extendable, for example, by means of a drive not shown in more detail. In a retracted transport position, the supporting elements 54 are arranged in the interior space 51. In an extended working position, the supporting elements 54 are arranged outside the interior space 51. The supporting elements 54 each comprise a carrier 55 and a guide roller 56 arranged on the carrier 55. By means of the guide roller 56, the mounting element 21 can be supported at the first end on a respective rail 6. The guide rollers 56 have axes of rotation running parallel to the y-direction and center the mounting element 21 relative to the rails 6.

A plurality of protective elements 35 are arranged at the displacement device 18 to protect the working space A. Protective elements 35 are arranged on the mounting element 21 on the long sides, on the upper side and on the short side that forms the first end. The protective elements 35 are merely indicated in FIGS. 6 to 10. The protective elements 35 are, for example, configured as to be foil-like and are opaque, so that no persons outside the working space A are endangered by the welding in the working space A. Furthermore, a protective element 35 is arranged between the supporting elements 54. This protective element 35 is extended and retracted with the supporting elements 54.

To laterally delimit the working space A between the mounting element 21 and the track, frame components 57 are arranged laterally on the mounting element 21 so as to be swiveled about swivel axes $S_1$ and $S_2$. The frame components 57 are U-shaped. Further protective elements 35 are arranged on the frame components 57.

Figure 6:
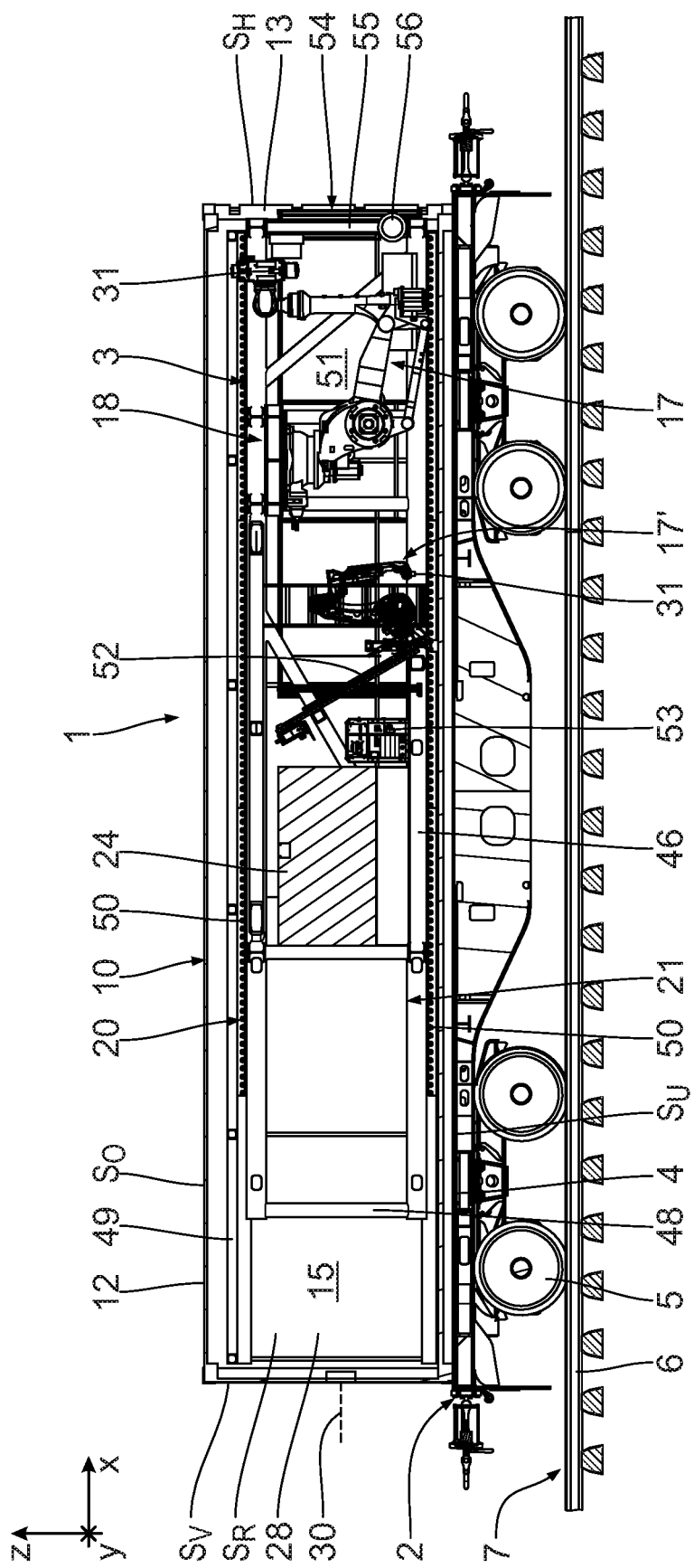
FIG. 6 shows a cutaway side view of a processing device for performing track work according to a fourth embodiment in a transport state.

In the transport state shown in FIG. 6, the multi-axis robots 17, 17' are arranged in the interior space 51 of the cuboid mounting element 21. For this purpose, the linear guide 52 is in a retracted transport state. Furthermore, the movement axes $B_1$ to $B_6$ are displaced such that the multi-axis robots 17, 17' take a compact transport position within the interior space 51. The supporting elements 54 are retracted and arranged within the interior space 51. The frame components 57 are swiveled in. The mounting element 21 is displaced into the interior space 15 of the enclosure 10, so that the displacement device 18 with the multi-axis robots 17, 17' arranged thereon is completely disposed in the interior space 15 of the enclosure 10.

For transferring the processing system 3 to the working state, the covering elements 13, which are designed as doors, are opened so that the enclosure opening 14, which is arranged on the short side $S_H$, is open.

Figure 7:
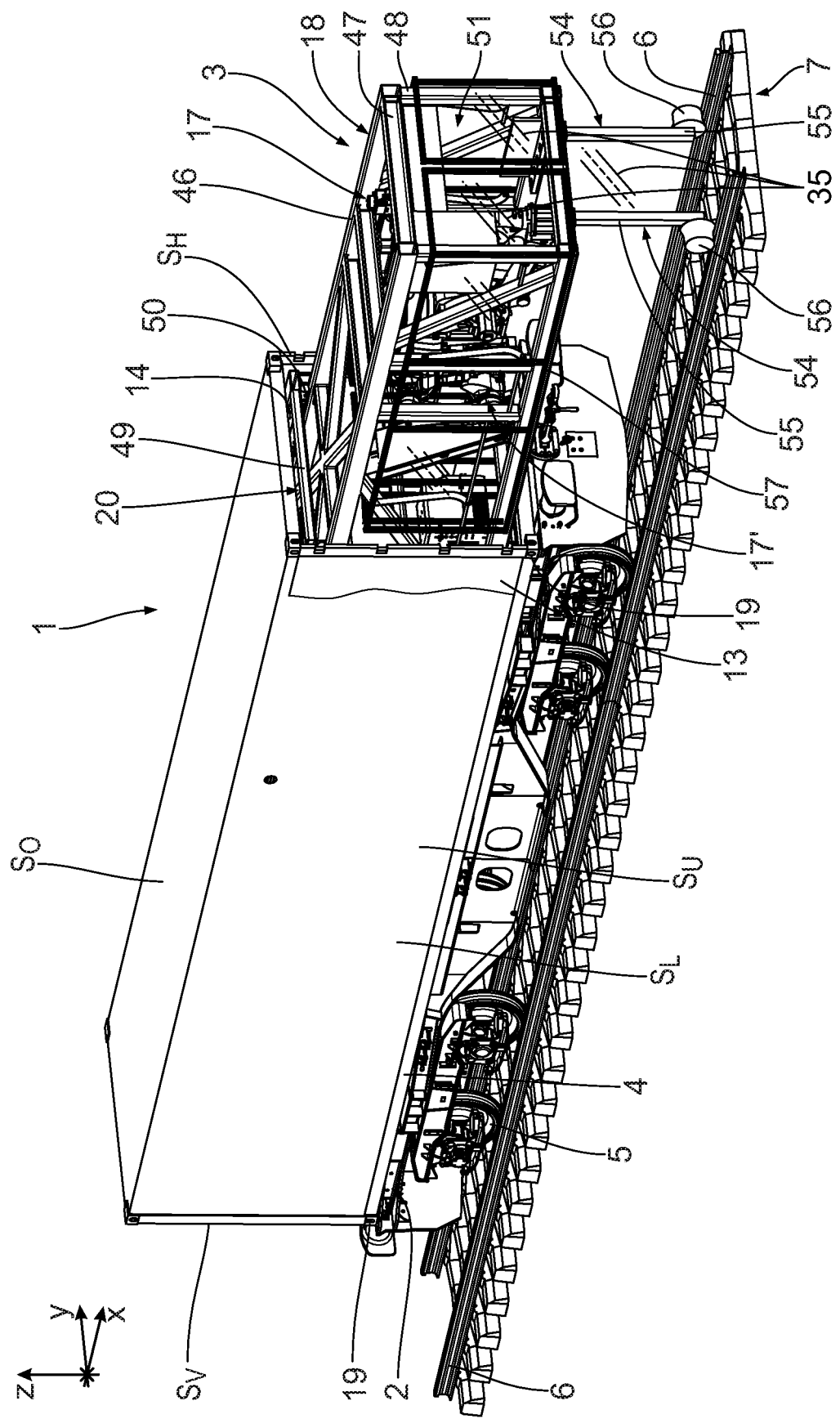
FIG. 7 shows a first perspective view of the processing device according to FIG. 6 during the transfer from the transport state to a working state.

The mounting element 21 is moved linearly out of the enclosure 10 by means of the guide 20. The supporting elements 54 are extended from the interior space 51 until the guide rollers 56 are arranged on the rails 6. The supporting elements 54 support the mounting element 21 during the extension and in the working state. During the extension, the guide rollers 56 guide the first end of the mounting element 21. For this purpose, the guide rollers 56 roll on the rails 6. FIG. 7 shows the processing system 3 during the extension.

Figure 8:
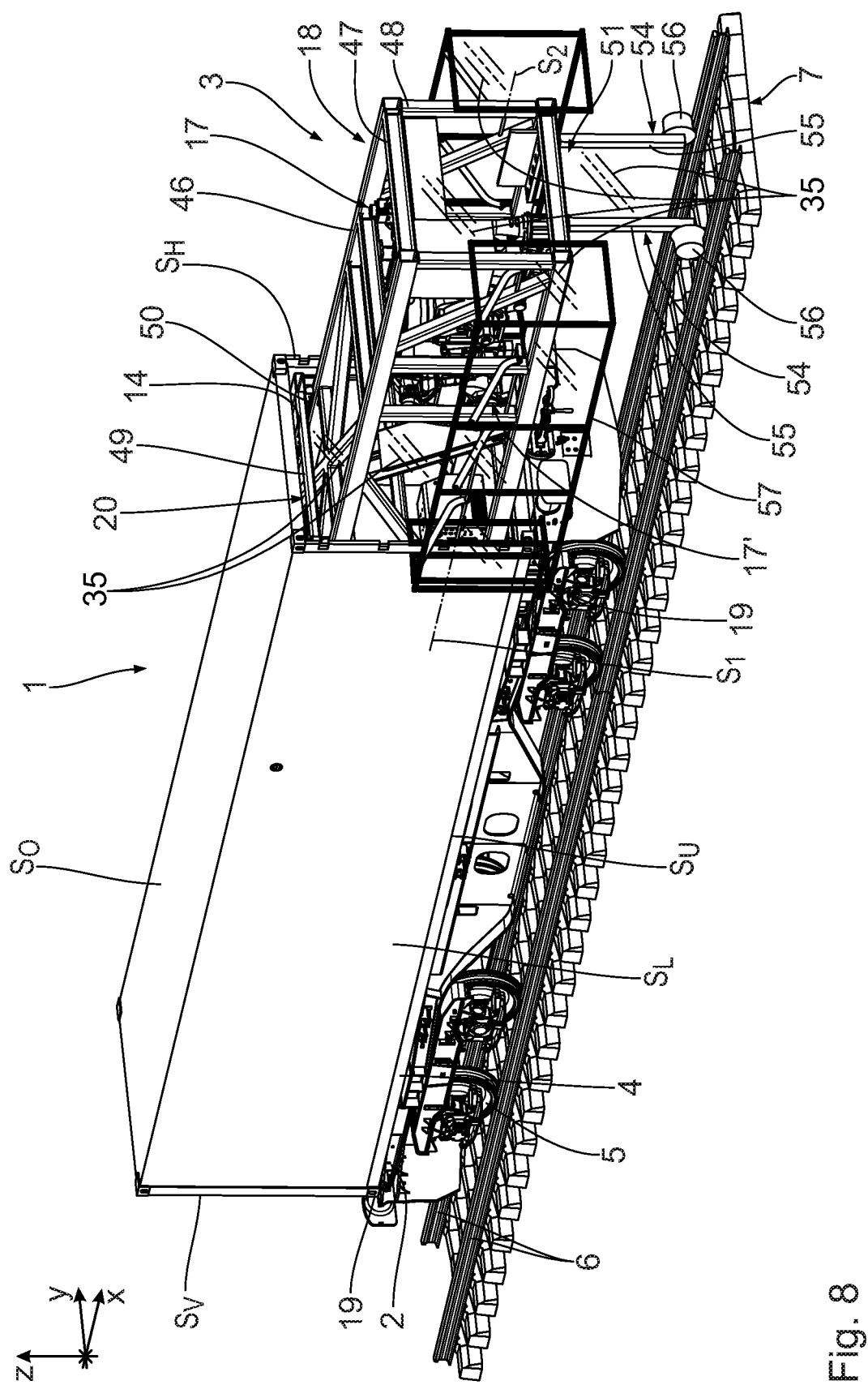
FIG. 8 shows a second perspective view of the processing device according to FIG. 6 during the transfer from the transport state to the working state.

When the mounting element 21 is fully extended, the working space A is delimited or shielded. The working space A is formed by the inner space 51 and the space between the mounting element 21 and the track. The mounting element 21 is already shielded by means of the protective elements 35 on the long sides, on the upper side and on the extended short side. By extending the supporting elements 54, the region between the first end and the track is shielded. In order to shield the lateral regions, the frame components 57 are swiveled about the swivel axes $S_1$ and $S_2$. The swiveling may be performed manually and/or automatically. FIG. 8 shows the processing system 3 during the swiveling out of the frame components 57 with the protective elements 35.

Figure 9:
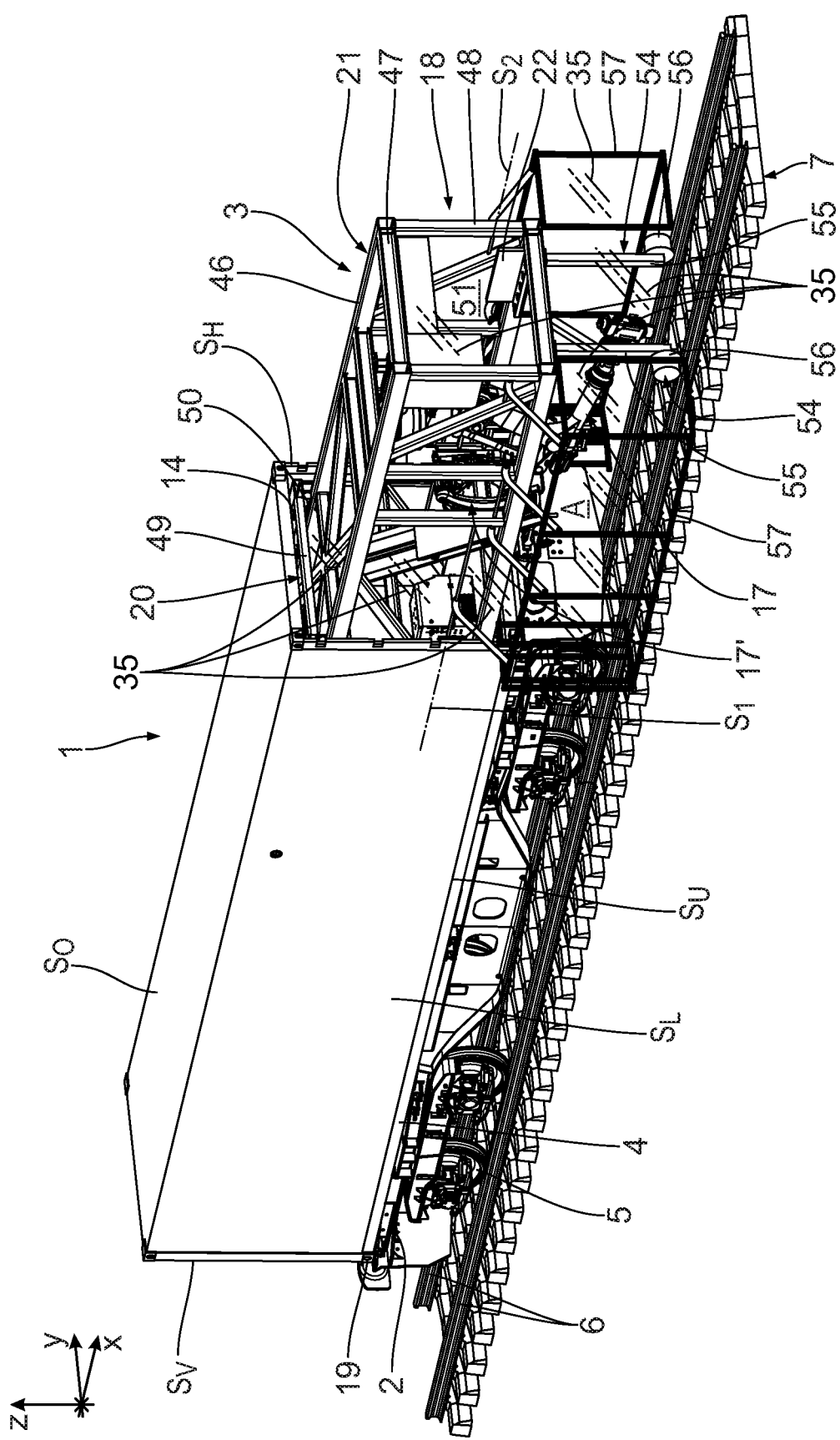
FIG. 9 shows a perspective view of the processing device according to FIG. 6 in the working state.
Figure 10:
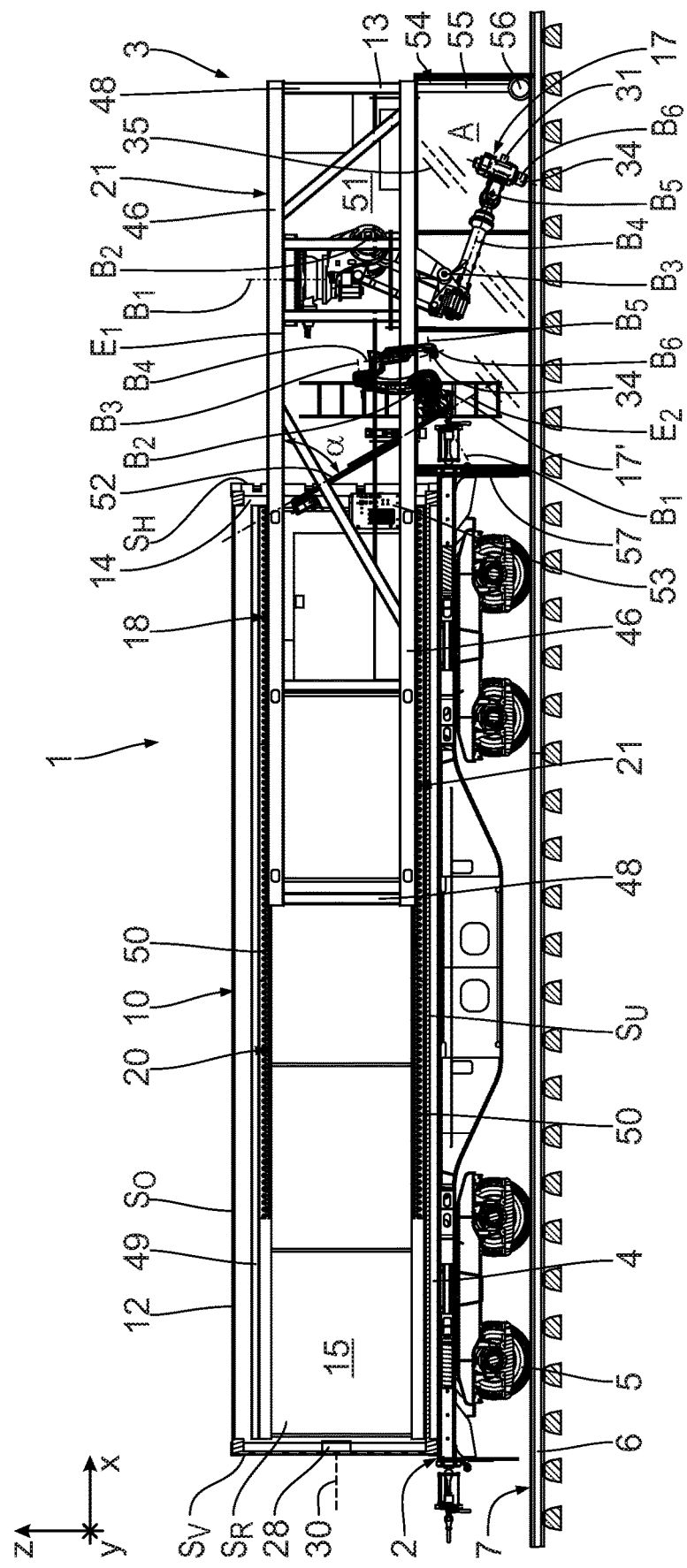
FIG. 10 shows a partially cutaway side view of the processing device in the working state according to FIG. 9.

In FIGS. 9 and 10, the processing system 3 is shown in the working state. After the working space A has been shielded on all sides, the performance of the track work begins. By means of the first multi-axis robot 17, a rail 6 to be processed is prepared for buildup welding and/or joint welding, for example by milling processing or grinding processing. Subsequently, the welding process is carried out by means of the second multi-axis robot 17'. The supporting elements 54 support the first end of the mounting element 21 while the track work is being performed, so that the multi-axis robots 17, 17' are mounted on the mounting element 21 with little or no vibration. As a result, the track work may be performed accurately and reliably.

The transfer of the processing system 3 from the working state to the transport state takes place in the reverse manner. With regard to the further structure and the further operating principle, reference is made to the preceding embodiments. In General:

There is considerable potential for automation in the maintenance of rail infrastructure. The existing rail infrastructure is suitable for transporting automated maintenance solutions to the place of use. Up to now, maintenance work has been carried out mainly by hand with the aid of hand-guided tools. The maintenance work or track work has a high manual component and is physically strenuous for workers. Further, workers are exposed to environmental influences and dangers.

The processing system according to the invention comprises an enclosure, preferably with dimensions and/or interfaces according to ISO standard and with an integrated multi-axis robot. Preferably, the processing system comprises a tool magazine, a control unit and/or its own power supply. The processing system may be transported on standardized means of transport, such as a truck, a rail car and/or a container ship, and thus be brought to the place of use. During the transport, the multi-axis robot is protected from environmental influences in the closed enclosure. At the place of use, the enclosure may be parked in a fixed location or fastened to a trolley so that it can be displaced flexibly with little effort. For example, the enclosure may have its own drive for locomotion. The enclosure may, for example, be connected to a crawler chassis or a chassis similar to a walking excavator. At the place of use, the multi-axis robot is displaced from the container to perform maintenance operations and track work on the railroad infrastructure. For displacement, the multi-axis robot is arranged on a displacement device. The displacement device comprises, for example, a linear guide with a drive. For transport, the displacement device may be locked in a transport position.

For performing track work, the processing system preferably comprises a tool magazine with tools and equipment required for the respective application and, if necessary, a tool changing system. In addition, the processing system may include a material store.

The energy supply of the processing system is either provided by supplying electric energy from outside via a connection or via its own energy supply.

The multi-axis robot can perform work above head height, for example on overhead lines or overhead line masts, as well as work on the ground, for example on tracks or objects close to the ground. Furthermore, the multi-axis robot can perform work to the side of the tracks, for example on noise barriers.

The displacement device may be designed differently as required and may enable the multi-axis robot to move, rotate and/or lift.

In particular, the processing system includes sensors and a controller suitable for moving the multi-axis robot into a suitable position to perform the desired maintenance operations.

By installing a multi-axis robot in an enclosure according to ISO standards or in an ISO container, simplified rail network access conditions and approval conditions for use and transport on the track apply. As a result, the processing system can be used easily and flexibly.

In particular, the displacement device enables a slide to which the multi-axis robot is fastened to be moved beyond the buffer chest of a freight car or flat car. If required, the displacement device enables a tilting and/or a rotation.

The displacement device comprises at least one linear axis, for example a linear axis in longitudinal direction and/or a linear axis in transverse direction and/or a linear axis in vertical direction of the enclosure. The displacement device may be fastened to the enclosure at an underside, an upper side and/or one of the long sides. A safety device may be provided in the enclosure to separate an action region of the multi-axis robot and/or the displacement device from a secured people region. In the people region, material or tools may be prepared by a worker.

The processing system may include an auxiliary lifting device which is transported in an enclosure and displaced from the enclosure at the point of use. An auxiliary lifting device serves, for example, to reduce the weight to be handled by the multi-axis robot, since heavy objects can be handled by means of the auxiliary lifting device.

The processing system enables an automation of the working processes. This leads to a high and constant quality in the execution of the work and to an exact documentation of the work. Workers can be relieved and protected from environmental influences and dangers. Furthermore, work can be carried out easily and flexibly, in particular independently of a time of day.

The processing system according to the invention thus enables work on the railroad infrastructure to be carried out easily, flexibly, safely and reliably.

The invention claimed is:

1. A processing system for performing track work with at least one multi-axis robot, the processing system comprising:
    an enclosure being a container for receiving and housing the at least one multi-axis robot;
    at least one displacement device configured for displacing the at least one multi-axis robot between a transport position inside said enclosure and a working position outside said enclosure;
    said at least one displacement device including a mounting element having a cuboid-shaped frame;
    said at least one multi-axis robot being fastened to said mounting element;
    said mounting element defining a working space in which said at least one multi-axis robot is arranged;
    said mounting element being displaceable relative to said enclosure; and
    said at least one displacement device including at least one supporting element for supporting a free end of said mounting element on a track.

2. The processing system according to claim 1, wherein said enclosure is formed with at least one enclosure opening for passing through the at least one multi-axis robot.

3. The processing system according to claim 2, wherein said at least one enclosure opening is formed on at least one of a short side or a long side or an upper side of said enclosure.

4. The processing system according to claim 1, wherein said enclosure has a plurality of walls and at least one covering element, displaceable relative to said walls, for opening and closing at least one enclosure opening formed in said enclosure.

5. The processing system according to claim 1, further comprising a plurality of fastening elements arranged at said enclosure for fastening said enclosure to a chassis.

6. The processing system according to claim 1, wherein said at least one displacement device defines at least one linear axis for linearly displacing the at least one multi-axis robot.

7. The processing system according to claim 1, wherein said at least one displacement device defines at least one swivel axis for swiveling the at least one multi-axis robot.

8. The processing system according to claim 1, wherein said at least one displacement device is lockable in at least one of the transport position and in the working position.

9. The processing system according to claim 1, further comprising a tool magazine disposed in said enclosure.

10. The processing system according to claim 1, further comprising a dry ice supply unit for treating surfaces.

11. The processing system according to claim 1, further comprising at least one of an energy generator or an energy storage device.

12. The processing system according to claim 1, further comprising at least one sensor for at least one of controlling said at least one multi-axis robot or monitoring a working space.

13. The processing system according to claim 1, further comprising a control unit for controlling the at least one multi-axis robot.

14. The processing system according to claim 1, further comprising at least one protective element for at least one of protecting against environmental influences or delimiting a working space.

15. The processing system according to claim 1, wherein the at least one multi-axis robot is one of two robots including a first multi-axis robot and a second multi-axis robot for at least one of buildup welding and joint welding.

16. A processing device for performing track work, the device comprising:
    a chassis; and
    a processing system according to claim 1 arranged on said chassis.

17. The processing system according to claim 1, wherein said mounting element is formed in a grid-like manner by longitudinal struts, transverse struts and vertical struts.

18. The processing system according to claim 1, wherein said at least one supporting element is arranged at said mounting element and is displaceable relative to said mounting element.

19. A method for performing track work, the method comprising the following method steps:
- providing a processing system according to claim 1;
- transporting the processing system to a track location to be processed, wherein the at least one multi-axis robot is located inside the enclosure in the transport position;
- transferring the at least one multi-axis robot from the transport position to the working position outside the enclosure by way of the at least one displacement device; and
- performing the track work by way of the at least one multi-axis robot.

* * * * *